United States Patent [19]

Moffitt et al.

[11] 4,382,295

[45] May 3, 1983

[54] DIGITAL CONFERENCE TIME SLOT INTERCHANGER

[75] Inventors: Bryan S. Moffitt, Eatontown, N.J.; Alexander R. Ross, Allentown, Pa.

[73] Assignee: Bell Telephone Laboratories, Incorporated, Murray Hill, N.J.

[21] Appl. No.: 256,970

[22] Filed: Apr. 23, 1981

[51] Int. Cl.³ .................... H04M 3/56; G06F 7/00; H04Q 11/04

[52] U.S. Cl. ................................................ 370/68

[58] Field of Search .................. 370/68, 62, 59, 110, 370/66, 100; 179/18 BC; 364/200 MS File

[56] References Cited

U.S. PATENT DOCUMENTS

| | | | |
|---|---|---|---|
| 4,051,358 | 9/1977 | Schwartz | 364/716 |
| 4,059,735 | 11/1977 | Betts | 179/18 BC |
| 4,112,258 | 9/1978 | Alles | 370/110 |
| 4,112,490 | 9/1978 | Pohlman et al. | 364/200 |
| 4,119,807 | 10/1978 | Nahay | 370/62 |
| 4,125,747 | 11/1978 | Picquendar | 370/59 |
| 4,225,956 | 9/1980 | Betts et al. | 370/62 |
| 4,228,536 | 10/1980 | Gueldenpfennig et al. | 370/66 |
| 4,229,814 | 10/1980 | Betts | 370/62 |

OTHER PUBLICATIONS

Chapter 4: "Telephony and Signal Processing," Intel Corp., 1980, pp. 0207-0223.

*Primary Examiner*—Thomas A. Robinson
*Attorney, Agent, or Firm*—David H. Tannenbaum

[57] ABSTRACT

A time slot interchanger is disclosed for selecting and buffering digital signals between buses. The arrangement is particularly useful in forming conferences in a distributed digital time division system. In one embodiment, a clock is used to generate time signals corresponding to time slots of the first bus. These signals are sequentially provided to an associative memory and when a match occurs between the provided signal and a priorly stored time slot identity, an enable signal is provided. The enable signal has a time identity with a first bus time slot and a physical identity with a particular second bus time slot. The enable signal is used to gate into a second memory the time slot signal associated with the time identity at the storage location in the second memory corresponding with the particular time slot of the second bus associated with the enable signal. The signal samples are then sequentially removed from the second memory.

25 Claims, 12 Drawing Figures

ACCESS TIMING

1

DIGITAL CONFERENCE TIME SLOT INTERCHANGER

BACKGROUND OF THE INVENTION

This invention relates to a digital conferencing system and more particularly, to a time slot interchanger for buffering information from one time slot bus to a second time slot bus.

In a time division distributed conferencing system of the type disclosed in copending concurrently filed patent application of Baxter, Berkowitz and Buzzard, Ser. No. 256,937, which application is hereby incorporated by reference herein, conferences are formed between terminals remotely located from a central processor. In such a situation it is necessary to remove signal samples from a system bus having a large number of time slots and to assemble several samples together for distribution to the terminals grouped at the remote location. The assembled samples must be compiled within a given time frame and provided to the stations over a station bus having a different number of time slots than does the system bus. A further constraint on the system is that each assembled conference must be capable of having each sample individually modified by a variable preset transmission gain value. Since the system may have numerous such groups of terminals, it is necessary to insure that the processing which must be done at each group is minimized.

Thus, it is desired to construct a time multiplexed system with time slot interchange capability and with the ability to conference together a group of time slots for a given communication connection. A typical prior time slot interchanger is constructed using a time slot assignment (TSA) memory and two sample buffer memories. The TSA memory contains, for each time slot, an instruction which points to a location within the sample buffer. The system processor loads the instructions into the TSA memory for each communication connection. A time slot clock operates to sequence through the TSA memory and for a given time slot address in the TSA memory a sample buffer memory address is provided. The data sample associated with the given time slot is loaded into the sample buffer at the location therein identified by the address obtained from the TSA memory. This system is shown in copending patent application of R. P. Abbott, et al., Ser. No. 73,849, now U.S. Pat. No. 4,298,977, issued Nov. 3, 1981. The Abbott disclosure, while advantageous from the time slot interchange standpoint, requires the time slot address memory to have as many memory locations as there are input bus time slots. In addition, when establishing the sample buffer address in the time slot address memory, only one sample buffer address can be used for each time slot address memory. Thus, the Abbott system is not designed to form conferences between time slots, since for conference capability, the same time slot sample must be stored in more than one buffer location.

SUMMARY OF THE INVENTION

A time slot interchanger is disclosed for selecting and buffering digital signals between buses. The arrangement is particularly useful in forming conferences in a distributed digital time division system. In one embodiment, a clock is used to generate time signals corresponding to the first bus time slots. These signals are sequentially provided to an associative memory, and when a match occurs between the provided signal and a priorly stored time slot identity, an enable signal is provided. Each associative location has comparison logic and an enable output signal. Each enable signal has a time identity with a priorly established first bus time slot and a physical identity with a particular second bus time slot. The enable signal causes a write of the time slot signal corresponding to the time identity into a storage location in a buffer memory corresponding to the particular time slot of the second bus. The signal samples are then sequentially removed from the buffer memory.

In this embodiment, the associative memory, also known as a content addressable memory (CAM), and the sample buffer need only contain as many locations as there are time slots on the second or conference bus. Thus, for a 256 time slot main bus and a 32 time slot secondary bus there need only be 32 locations for both the CAM and the sample buffer. For a given time slot transfer the central processor loads into the CAM, at the storage location therein associated with the desired output bus time slot, the identity of the main bus time slot. When a match occurs between a time slot clock and a time slot address loaded into the CAM, an output signal is provided to the sample buffer at the corresponding location, thereby allowing the given time slot sample to be written into that location in the buffer. The sample buffer is then sequentially read onto the output bus.

Since the same time slot identity can be written into multiple CAM locations, the same time slot sample can be loaded into multiple sample buffer memory locations. In this manner multiple conferences can be obtained on the output bus.

BRIEF DESCRIPTION OF THE DRAWING

These and other objects and features, together with the operation and utilization of the present invention, will be more fully apparent from the illustrative embodiment shown in conjunction with the drawing in which FIG. 10 shows how FIGS. 8 and 9 should be arranged.

GENERAL DESCRIPTION

Figure 1:
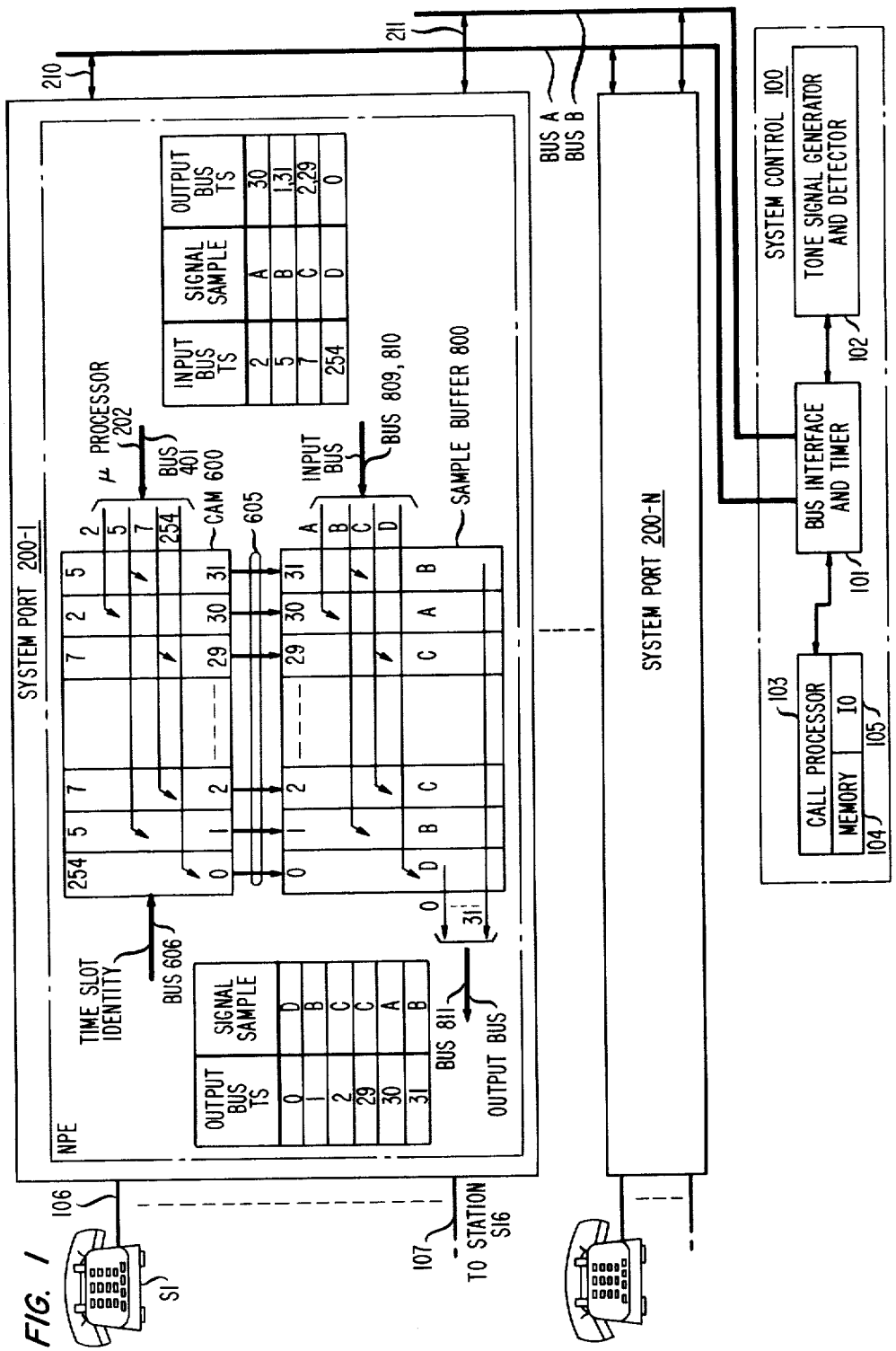
FIG. 1 is a broad block diagram showing a distributed communication system having the time slot interchange algorithm of our invention shown within the Network Processing Element (NPE) of a system port.

The time slot interchange function, as performed in a digital conferencing system, such as that shown in priorly mentioned copending patent application of Baxter, et al, is shown in FIG. 1. The operation of the overall system will be detailed hereinafter. However, prior to entering into such a description it may be beneficial to concentrate a moment on the interchange of time slot signal samples using content addressable memory 600 and sample buffer 800, both shown in FIG. 1 and shown in expanded form in FIG. 11.

From the chart it will be seen that for at least some portion of time it is desired to interchange signal sample A, which has an input time slot identity of time slot 2 onto the output bus at time slot 30. Similarly, it is desired to interchange signal sample B, having an input bus identity of 5 onto output bus time slots 1 and 31. The same type of interchange is desired for input bus time slots 7 and 254.

In this example, the system processor, via bus 401, writes the coded identity for time slot 254 into position 0 of CAM 600. Time slot identity 5 is written into CAM 600, position 1; time slot identity 7 is written into position 2; time slot identity 7 is written into position 29, time slot identity 2 is written into position 30; and time slot identity 5 is written into position 31.

As will be seen, each of the physical positions of CAM 600 corresponds to a particular one of the output bus time slots and also corresponds to a particular one of the storage locations within sample buffer 800. Once the time slot identities are written into CAM 600, they remain until changed under control of the system processor. Any set of interchanges can be updated without the need to change the entire memory, if that is so desired.

A time slot counter provides a sequence of time slot identity input signals over bus 606. CAM 600 is arranged, in the well known manner, and as will be described hereinafter, to compare the input signals against information stored at the various storage locations therein. Thus, when bus 606 provides the identity 2, the memory element in physical position 30 provides a match signal via cable 605 to sample buffer 800. The clock signals on bus 606 are synchronized with the time slots on input bus 809, 810. Thus, the match signal to position 30 from CAM 600 opens that position in sample buffer 800 for the storage of the signal sample currently on the input bus, in this case signal sample A. Accordingly, signal sample A is stored in buffer 800 at position 30. When the clock signal goes to 5, positions 1 and 31 of buffer 800 open and signal sample B is stored at both locations therein.

At the completion of the entire frame, i.e., when the time slot counter reaches the count of 255, sample buffer 800 is examined sequentially from 0 through 31 and the information stored therein is read out onto the output bus 811. The signal samples are then available on the output bus during the time slots desired.

DETAILED DESCRIPTION

FIG. 1 illustrates a communications system in which the conferencing control is distributed among the system ports 200-1 to 200-N. The time slot interchanger operates within this system, but will also operate with other switching or transmission systems as well. Each such port of the system serves a number of terminals, such as station S1. Serving the system ports there is shown a dual bus digital system, having Bus A and Bus B, with common system control 100. The system control has bus interface and timer 101, call processor 103 and tone source/signal detector 102. The call processor operates to take in stimulus from the stations via the ports and to control station interconnection by establishing the time slots which are to be used for each station. Processor 103 provides control information to the system ports indicative of the identity of the time slots which must be combined for a given conference. This operation is well known and shown in, for example, U.S. Pat. No. 4,119,807 issued to L. P. Nahay. The control section also includes tone signal generator and detector 102 for generating and detecting call progress tones. The system shown handles voice signals, as well as data, between the various stations. The conference summing feature would be used for voice conferencing in this system.

Figure 2:
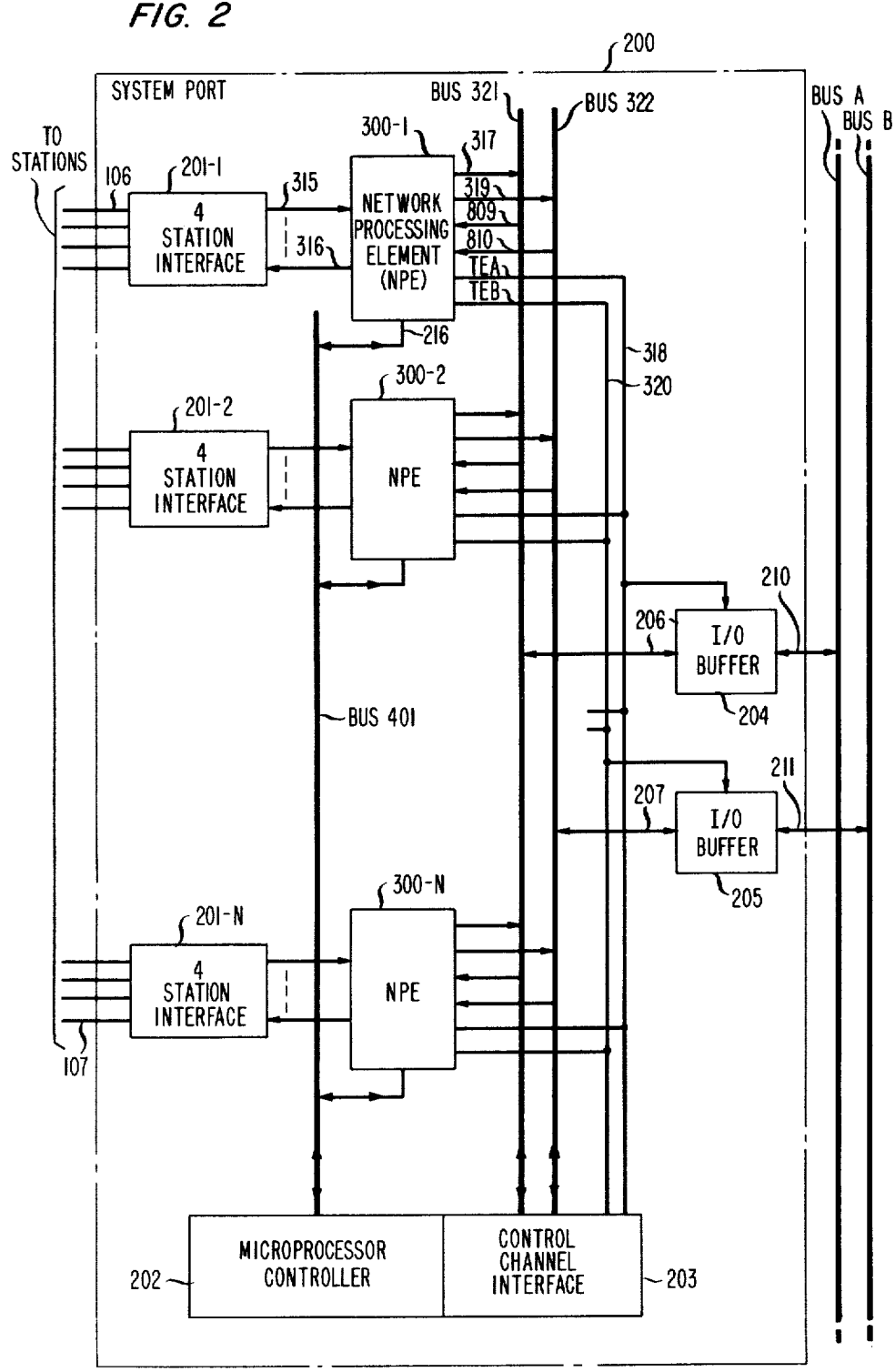
FIG. 2 is a block diagram showing the arrangement of a system port.

The system port shown in FIG. 1 has been expanded in FIG. 2 to show the circuit elements. I/O buffers (204, 205) interface the port circuits to the high power-high fanout system buses A and B. The Network Processing Elements 300 (NPE), of which only three are shown, process and control the signals between the stations and the buffered buses 321, 322. The NPEs transmit signals from each of the stations onto either of the two buses and receive signals for each station from either bus. The NPEs operate to perform the distributed conferencing function in the manner to be discussed hereinafter.

Each network processing element as shown is capable of handling data to or from four stations. Station interface circuits 201 contain either codecs or digital station formatting circuits to send or receive samples from a station. Each station interface circuit operates to properly format the samples coming to and from a digital station, and operates to convert between analog and digital transmission for an analog station.

Line 106 handles bidirectional communication with station S1 (FIG. 1), while line 107 is associated with station S16 (FIG. 1). This configuration has been chosen for manufacturing convenience and any number of stations may be associated with a station interface and any number of interfaces can be associated with an NPE and any number of NPEs may be associated with a system port.

In FIG. 2 there is shown microprocessor controller 202 and control channel interface 203. Microprocessor controller 202 assigns transmit and receive time slots to each of the NPEs over bus 401. Control channel interface 203 allows microprocessor 202 to communicate over either bus 321 or bus 322 via bus A or bus B to Call Processor 103 via Bus Interface 101 (FIG. 1).

There are two buses designed into the illustrated system to double the capacity of the system. Each bus runs at 2.048 MHz sample rate allowing 256 time slots per bus. Having two buses allows up to 512 time slots but the use of two buses is not required for the distributed conferencing or time slot interchange inventions.

I/O buffers 204 and 205 operate in either direction and are under control of the NPEs or control channel interface 203. Each of the buffers normally receives samples from the bus during all time slots, but, when any particular NPE requires a transmission on a particular time slot, that NPE will force the buffer to transmit while simultaneously outputing its data to the corresponding bus (321 or 322). The NPE will signal the buffer via the TEA (or TEB) line causing the corresponding buffer to transmit the data on bus 321 (322) onto the system bus A (B).

A call is established in the system by call processor control 103, FIG. 1, as a result of a stimulus from a station over a line, such as line 106. This stimulus in received by microprocessor controller 202 (FIG. 2) which sends a stimulus signal through control channel interface 203 over either bus A or bus B to call processor 103, FIG. 1. The call processor establishes which time slots are to be used for the call and sends a response signal back over either bus A or bus B to control channel interface 203 of the ports involved. The microprocessor controller at those ports then programs the NPEs to transmit and receive on specified time slots for the duration of the call.

TIME SLOT CONTROL

Figure 3:
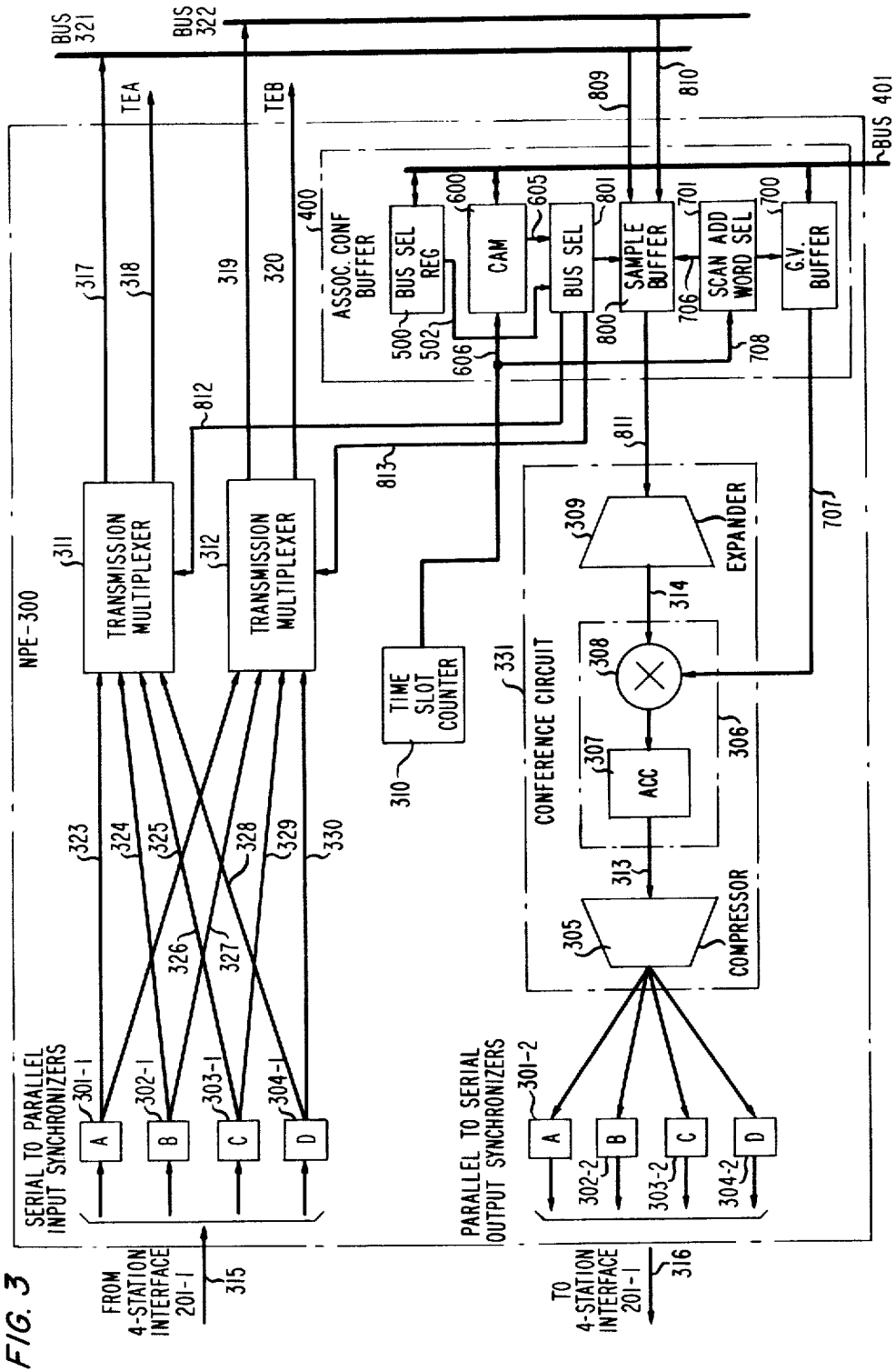
FIG. 3 is a block diagram of the network processing element of each system port.

NPE 300 described in FIG. 2 is expanded in FIG. 3 to illustrate its operation in the system. For purposes of illustration let us assume the NPE shown in FIG. 3 is associated with four stations, namely A, B, C and D. Transmission from Station A is via line 301-1 while transmission to station A is via station 301-2. It should be kept in mind that transmission from any station A through D may terminate at any other station A through D served by the same NPE or by any other NPE. The conference here is restricted to one NPE for the purpose of illustration. Transmission multiplexers 311 and 312 transmit samples from each station onto the buses during time slots established by the Associative Conference Buffer 400 (ACB). Simultaneous to the samples being transmitted onto the bus, samples are being received from the bus and sent to each of the four stations A-D, all through ACB 400 and conference circuit 331. ACB 400 is programmed by microprocessor controller 202 (FIG. 2) over bus 401 to receive data samples from specific time slots and to group the data samples from these time slots for conference summing and subsequent transmission to the proper stations. The sums are presented to the proper station via synchronizers 301-2, 302-2, 303-2 and 304-2. The conference sums are developed in a time multiplex fashion independently for each of the four stations. The ACB reorders the samples in the manner to be more fully discussed, so that the conference logic will produce four independent sums each of which will go to the corresponding station interface. Conference circuit 331 receives 32 independent samples from the ACB. The 32 samples are conferenced in four groups of eight samples each. The first eight samples of the 32 are added together and sent to station A over synchronizer 301-2. The second eight are added together and sent over synchronizer 302-2 and so on for the third group of eight and the fourth group of eight. If the station is not receiving data at the time, all of its samples would be zero. This result could be accomplished either by all the signals being zero or all of their corresponding gains being zero. Under the present invention, the gain of each signal for each station is separately controllable.

ACB 400 acts to remove data from specified time slots of either of the buses and combine that data with specified buffering information (gain) for each time slot so that the conference can be controlled with respect to gain for any conferee. The value of such conference control lies in the fact that for different combinations of stations different gain values can be appropriately selected so that conferencing can be performed without vast differences in volume from different stations.

The ACB consists of four separate pieces of memory; namely a Content Addressable Memory 600 (CAM), a Sample Buffer 800 (SB), a Gain Value Buffer 700 (GVB), and a Bus Select Register (BSR). The CAM and the GVB are programmed over bus 401 by a microprocessor controller. The CAM is programmed to select time slots from the bus. The data in those time slots is loaded into the SB in the programmed order. The GVB is loaded by the microprocessor and each gain is used with a corresponding sample in the SB. Time Slot Counter 310 establishes both when the CAM will react to programmed time slots and when the samples along with their corresponding gains will be read out of the SB and GVB. As discussed, the read out will occur in a sequential order and will consist of 32 samples which will be in four groups of eight samples each.

The BSR 500 is also programmed over bus 401 and operates to select which bus each of the samples loaded into the SB come from. This bus selection is handled by bus select control 801.

Summarizing briefly, the NPEs (FIG. 2) in each of the system ports operate to control the movement of data on and off the bus. For this to occur in the proper sequence, the local Time Slot Counters 310 for each NPE must be synchronized over the entire system. This is accomplished via bus control 100 over buses A and B by bus interface and timer 101 in bus control 100 shown in FIG. 1. Bus interface and timer 101 contains a timing circuit which generates a clock and a frame signal. The clock signal is a 2.048 MHz signal which is the speed of the buses and the frame is a 8 kHz synchronization signal. The clock and frame signals go to every system port and are buffered at each port and provided to each NPE to count and reset the local time slot counter. This insures that, even though system control is distributed, all of the NPEs realize equivalent Time Slot Addresses.

TIME SLOT INTERCHANGER—DETAILED DESCRIPTION

Figure 4:
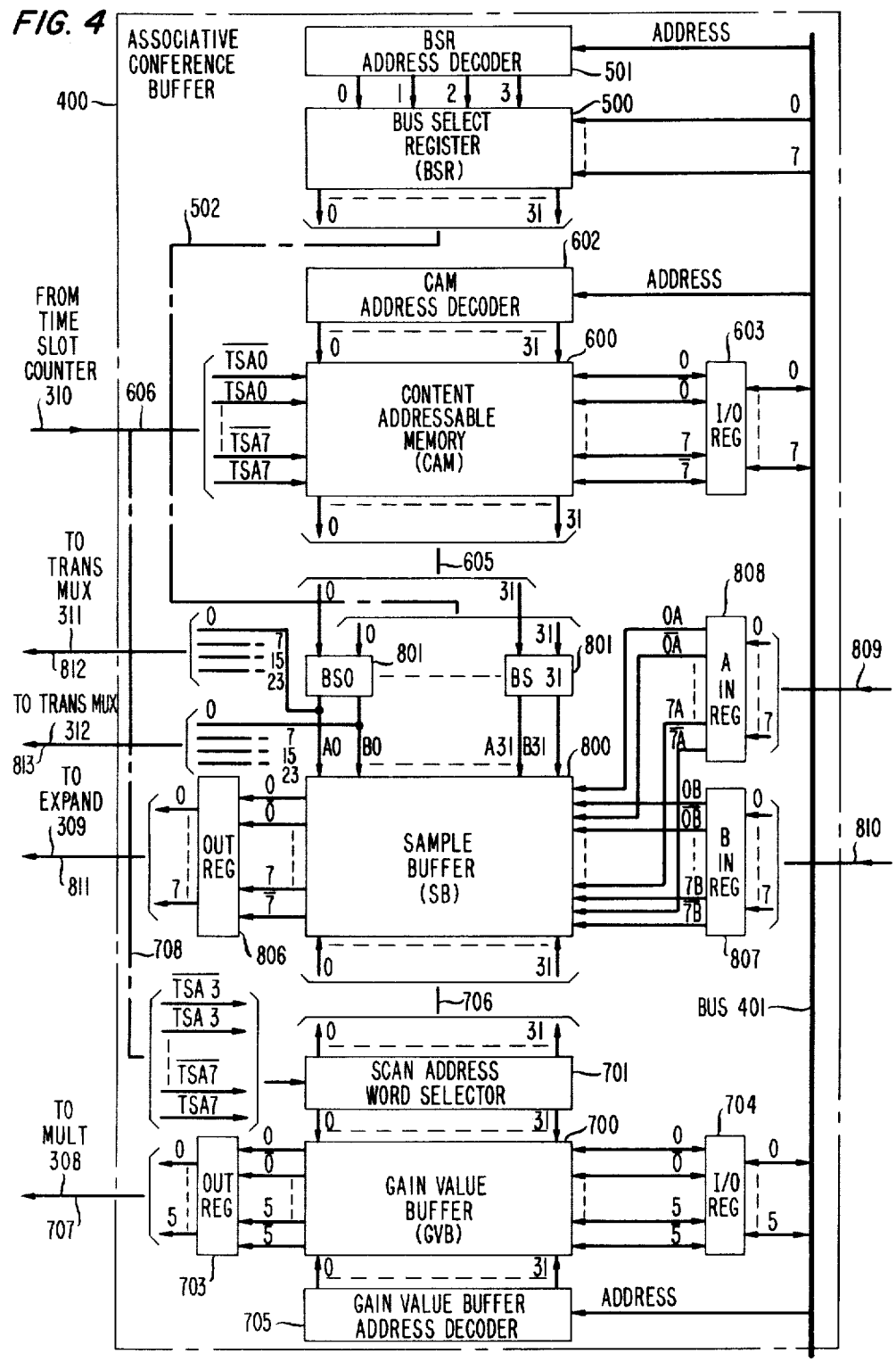
FIG. 4 is a schematic of the Associative Conference Buffer.
Figure 5:
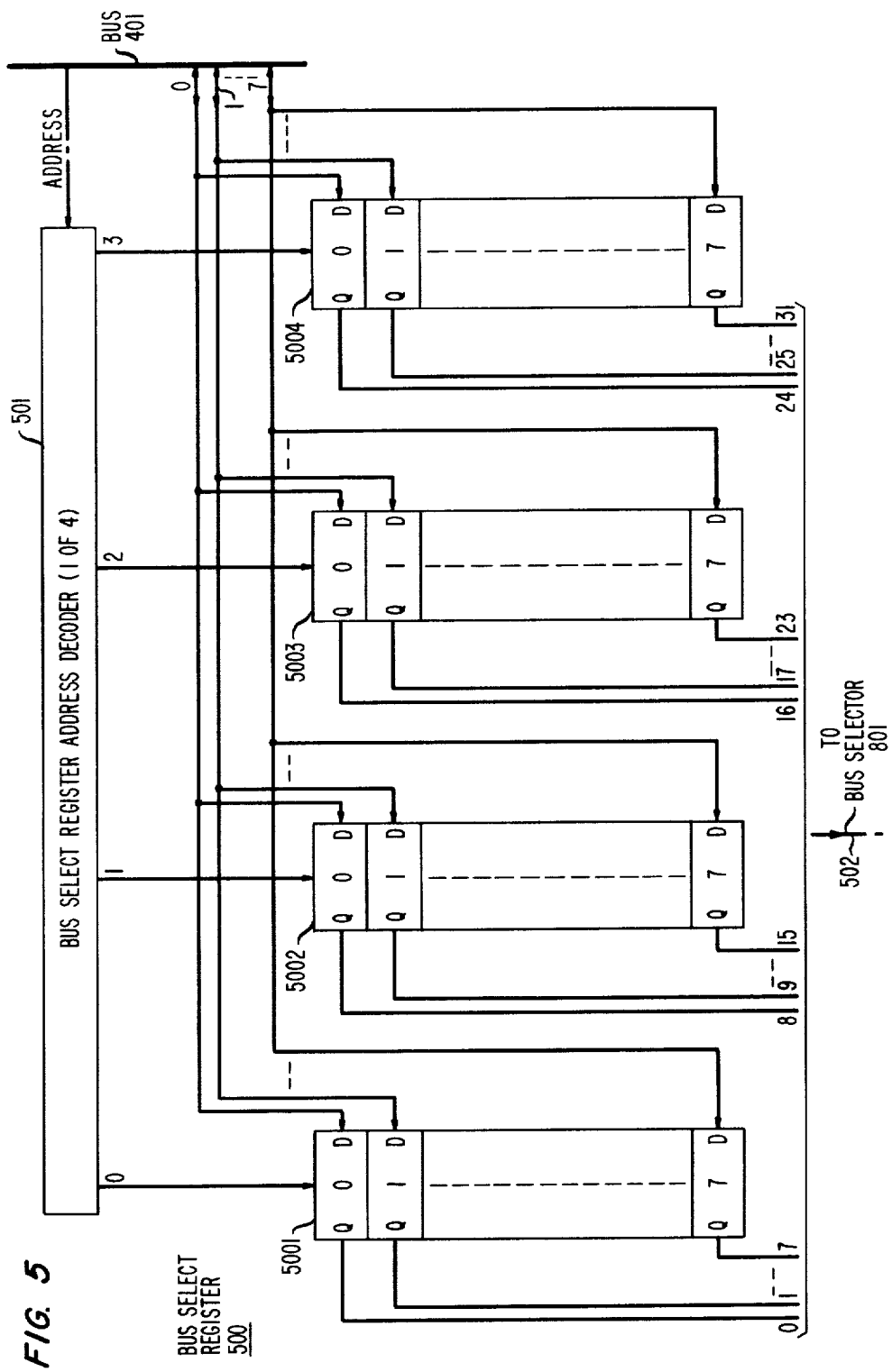
FIG. 5 is a schematic of the Bus Select Register.

Associative Conference Buffer 400, shown in expanded form in FIG. 4, operates to accept gain values and time slot addresses from the microprocessor controller over bus 401. Time slot addresses determine which time slots will be written to and read from the bus. The gain values are loaded into GVB 700 via I/O register 704. The time slot addresses are loaded into CAM 600 via I/O register 603. When a call between a given group of stations is established in the system the microprocessor at each port loads the gains values and the time slot addresses of the call for the duration of the call.

With the gain values and the time slot addresses loaded, the CAM 600 controls SB 800 to load samples from either bus 809 or bus 810. The samples are only loaded into SB 800 when a corresponding CAM location holds the time slot address of that sample. The precise manner in which this is accomplished is detailed hereinafter. The samples are held in the SB until being sequentially read out over bus 811 to expander 309 (FIG. 3).

CAM 600 recognizes the time slots on buses 809 and 810 by comparing the time slot address bits zero to seven (TSA0 to TSA7) over line 606 with the CAM's stored time slot addresses. Each CAM location individually compares its 8 bit data with the 8 bit data on line 606. If these are equal, that CAM location produces a match signal over the corresponding line of 605. This match signal causes a write into the corresponding SB location from one of the input registers (807 or 808). The CAM therefore can recognize 256 (0–255) distinct time slots or time intervals on bus 809 or 810. Each of these 256 time intervals could produce a write signal to the SB for writing the sample on the bus during that time slot. The scan or read out process of SB 800 is controlled by time slot address 3 through 7 (leads TSA3 to TSA7) via scan selector 701. The samples are thus scanned out of the SB over bus 811 at a rate one-eighth the rate that samples are presented to the SB. This results since the CAM recognizes time slot address bits 0 to 7 which are changing eight times faster than the time slot address bits 3 through 7. Samples are also written into the SB at this ⅛ rate but not uniformly, because this write may occur for any of the 256 time slots. Bus 811 therefore has 32 time slots whereas bus 809 and bus 810 each have 256 time slots.

SB 800 and CAM 600 along with time slot counter 310 perform a time slot interchange function which selectively removes samples from desired time slots on bus 809 or bus 810 and presents these samples in a specified order to bus 811.

Figure 11:
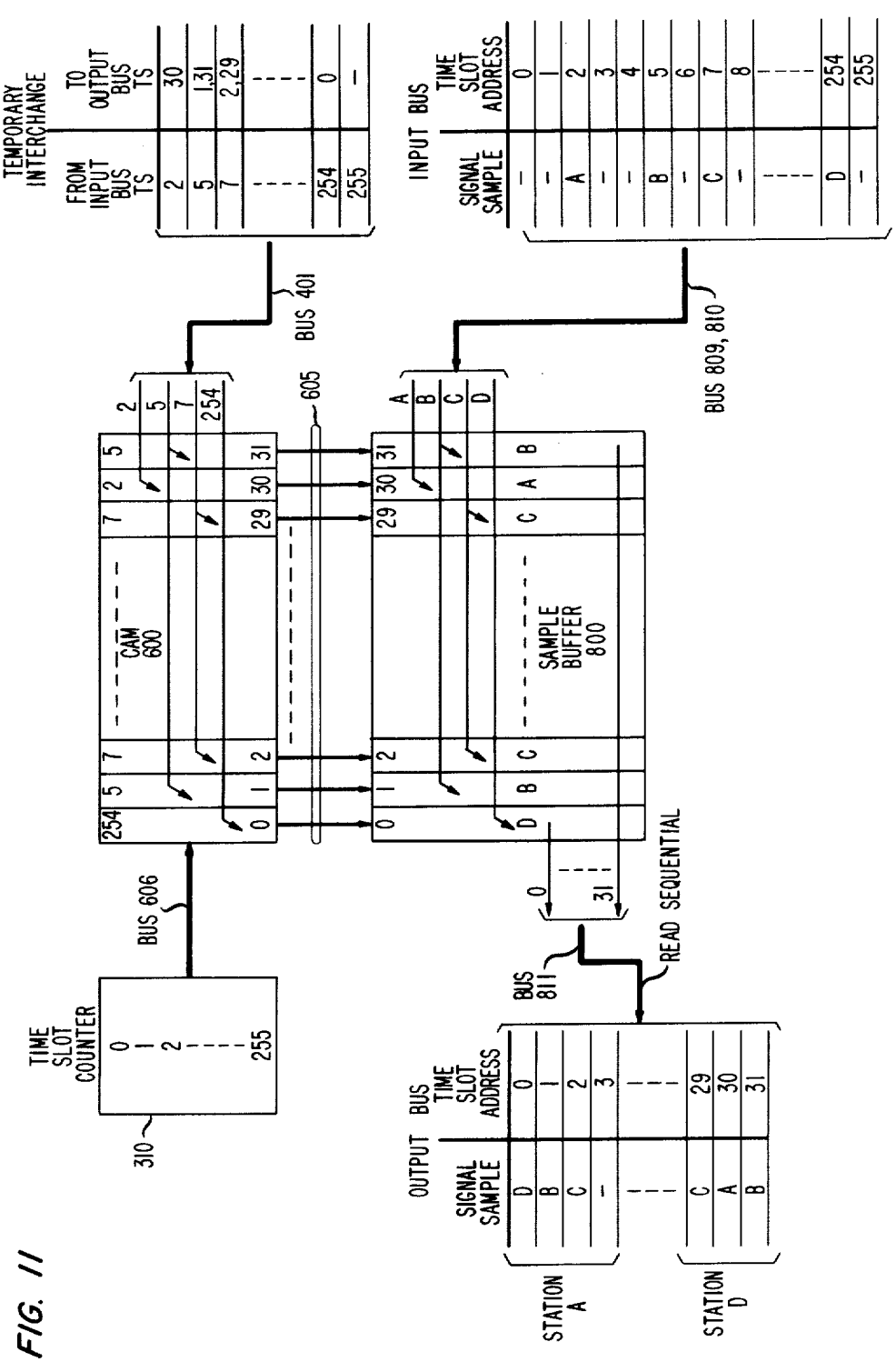
FIG. 11 illustrates the operation of the time slot interchange function between an input bus and an output bus.

The reordering process is graphically shown in FIG. 11 where samples are taken from an input bus (either bus 809 or bus 810) and transmitted to an output bus (bus 811). For purposes of illustration let us assume that on the input bus we have samples A, B, C and D which represent samples from four stations served by an NPE, such as shown in FIG. 3. It is, of course, understood that the samples can come from any station in the system and not only from the stations associated with this particular NPE. The main system processor has established the order shown in FIG. 11 where time slot address 2 has a sample from station A while time slot address 5 has a sample from station B and so on. Let us further assume that we have a four party conference between stations A, B, C and D. With respect to the output bus we will concern ourselves with the samples for stations A and D recognizing of course that there would be similarly buffered samples for stations B and C which have not been shown. It will be recalled that the 32 samples on the output bus are conferenced in four groups of 8, the first group for station A and so forth. Thus, samples D, B and C go to station A while samples C, A, and B go to station D. Each group of samples will be added together and sent to the corresponding station over synchronizers 301-2 to 304-2 of FIG. 3.

The interchange between the input bus and the output bus is controlled by CAM 600 such that CAM 600 is preloaded from the system controllers described priorly, to contain a 254 in position 0, a 5 in position 1, a 7 in position 2, a 7 in position 29, a 2 in position 30 and a 5 in position 31. For the duration of this call, these numbers will remain in the physical position shown. Thus, the central processor need only communicate with this NPE once per call unless a new station is added or subtracted from the conference call.

The operation then is to take the sample from input time slot 254 (sample D) and move it to output bus time slot 0. This occurs because CAM 600 operates, as will be more fully detailed, to compare each time slot identity against a stored number and to provide an output signal when a match occurs. Thus when the TSC reaches 254, a signal is provided from location 0 of CAM 600 to location 0 of SB 800. This signal serves to allow the data currently on the input bus to become stored at location 0 of SB 800. The second location, location 1 of CAM 600, has been loaded with a 5 indicating that the sample to be loaded into location 1 of SB 800 will come from time slot 5. This first and second SB location will then constitute the first and second time slots of the output bus. Similarly, CAM locations 2, 29, 30 and 31 are programmed with the time slot address of the input bus and their physical location in the CAM determines what time slot the samples will occupy on the output bus. As time slot counter 310 cycles from 0 through 255, its output is provided over bus 606 to CAM 600. Each time there is a match between the time slot count and a number stored in the CAM the physical location of the match in the CAM causes a write pulse to be present at the same physical location of SB 800. Thus the sample corresponding to that time slot from the input bus is loaded into the SB at that location.

Thus, as discussed above, when time slot address 2 appears on bus 606 memory location 30 of CAM 600 provides a write pulse into memory location 30 of SB 800 thereby causing the sample associated with time slot address 2 (which is sample A) to be written into location 30 of sample buffer 800. When the time slot address reaches 5, locations 1 and 31 of CAM 600 provide write pulses to locations 1 and 31 of SB 800 thereby causing sample B to be written into those two locations concurrently. At the end of a frame, the SB will be filled and a sequential read will begin so as to read the stored data to the output bus in the proper sequence and during the proper output time slot. In this manner, there is generated a 32 time slot bus (811) to present samples to the conference circuit.

Returning to FIG. 3 the time slot interchange is being controlled by CAM 600 and SB 800. The interchanged output samples are presented to expander 309. In addition, the Gain Value Buffer 700 (GVB) provides a gain value for each buffered sample. Scan address word selector 701 controls both the SB and the GVB so that each of the buffer locations has a corresponding location in the other buffer. Thus each of the 32 samples read onto bus 811 from the SB has a corresponding prestored gain sample read onto bus 707. The gain sample is then supplied to multiplier 308 of conference circuit 331 (FIG. 3). Each sample coming onto bus 811 passes through μlaw expander 309 and then is multiplied with its corresponding gain sample on bus 707. This establishes the gain coefficient for each of the samples on an individual basis. With this approach, the gain of each sample for each station may be tailored to that station, and may be further tailored depending upon the origin of the sample.

In groups of eight, these samples are then accumulated by accumulator 307 and the accumulated sum is then recompressed by μlaw compressor 305 and then sent out to the proper output station via one of the output synchronizers (301-2 to 304-2).

ASSOCIATIVE CONFERENCE BUFFER MEMORY ARRANGEMENT

Four basic memory systems are included in the associative conference buffer 400, namely Bus Select Register 500 (BSR), Content Addressable Memory 600 (CAM), Gain Value Buffer 700 (GVB), and Sample Buffer 800 (SB). FIGS. 5, 6, 7 and 8 provide the details of the operation of each of these memory systems. BSR 500 shown expanded in FIG. 5, consists of straightforward readable/writeable data flip flops. Decoder 501 selects one of four groups of eight bits to be written eight bits at a time from data bus 401. The outputs of these four, eight bit registers are used to determine bus selection for samples written into SB 800. The BSR functions to decide which bus, either bus 809 or 810, is to provide the samples to be written into the SB. This is accomplished on an individual basis for each of the SB locations. Without a dual bus structure, the BSR would not be required.

Figure 6:
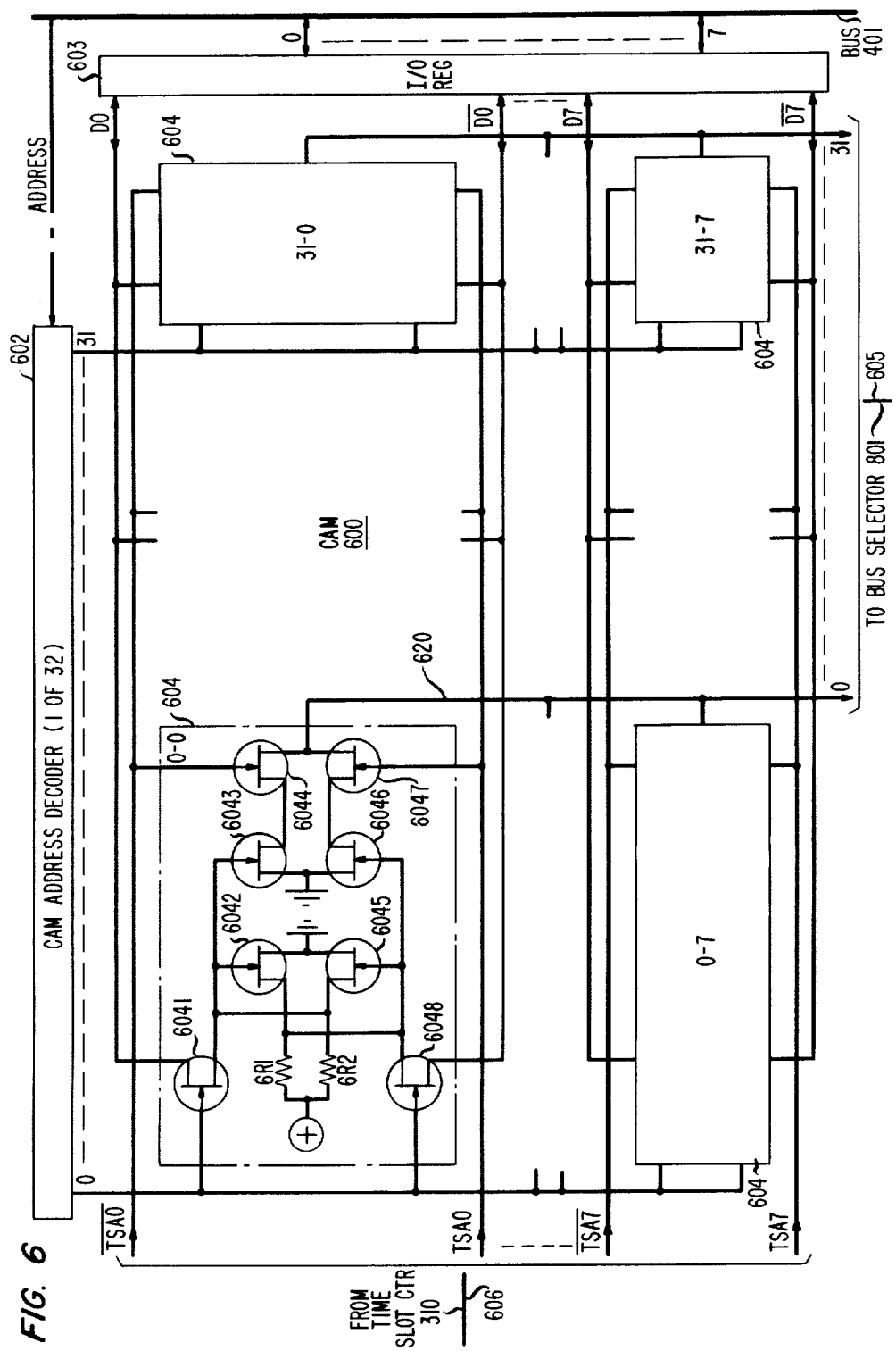
FIGS. 6, 7, 8, and 9 show the Content Addressable Memory, the Gain Value Buffer, and the Sample Buffer in detail.

CAM 600 is expanded in FIG. 6 showing the structure of each of the bit cells (e.g., 604) in the memory array and the manner in which the address decoder connects to this memory array. The CAM is read and written as any other standard memory through I/O register 603. The address is decoded by address decoder 602 to select 1 of the 32 (0-31) eight bit locations. When one of these locations is selected, the data to be written is taken via the I/O register and presented on the data line ($\overline{D0}$-$\overline{D7}$ and D0–D7) to the selected memory bit cells such as bit cells ∅-∅ to ∅-7. Each bit cell 604 is a static memory cell consisting of resistors 6R1, 6R2, and transistors 6042 and 6045 which form the latching portion of the cell. The cell is accessed for either the read operation or the write operation through transmission gates 6041 and 6048. The transmission gates are turned on or off by the address select line coming from address decoder 602. For data to be written into cell 0-0, the I/O register presents the data on lines D0 and $\overline{D0}$ and then the address decoder line 0 turns on transmission gates 6041 and 6048 allowing the data on lines D0 and $\overline{D0}$ to set or reset memory cell 0-0. The read operation is performed in similar manner. The address decoder, line 0, turns on transmission gates 6041 and 6048 and the data stored in bit cell 0-0 then propagates out on lines D0 and $\overline{D0}$ to the output register portion of I/O register 603.

In addition to the above-described standard memory operation there is associative recognition circuitry in each bit cell. For bit cell 0-0 this circuitry includes transistors 6043, 6044, 6046 and 6047 which perform an EXCLUSIVE OR operation between the data bit that is stored in cell 0-0 and the data bit that is brought in on line $\overline{TSA0}$ and TSA0. This EXCLUSIVE OR along with the EXCLUSIVE ORs in bits ∅-1 to ∅-7 compare the data from time slot counter 310 (TSA0 and TSA7) with the data stored in CAM location ∅, and when they match, line 620 goes high. Line 620 (bit line 0) only goes high when each bit of CAM location ∅ equals each bit of TSA∅ to TSA7. The eight bits as a group hold a prestored time slot address and all are compared simultaneously with the incoming time slot address. When all eight stored bits match all of the bits on line 606, line 620 becomes active indicating this match. Thus a match signal is produced from lead 0 of 605. Each of the 32 eight bit locations in the CAM have identical comparison circuits and operate to independently compare the data stored therein with the data on line 606.

Turning again to FIG. 11, as discussed previously, location 0 can be stored with a binary 254 as an eight bit number. Thus, there are 32 independent match lines, each of which will indicate when the data stored in the corresponding location of the CAM equals the data on line 606.

DUAL ACCESS MEMORY STRUCTURE

Figure 7:
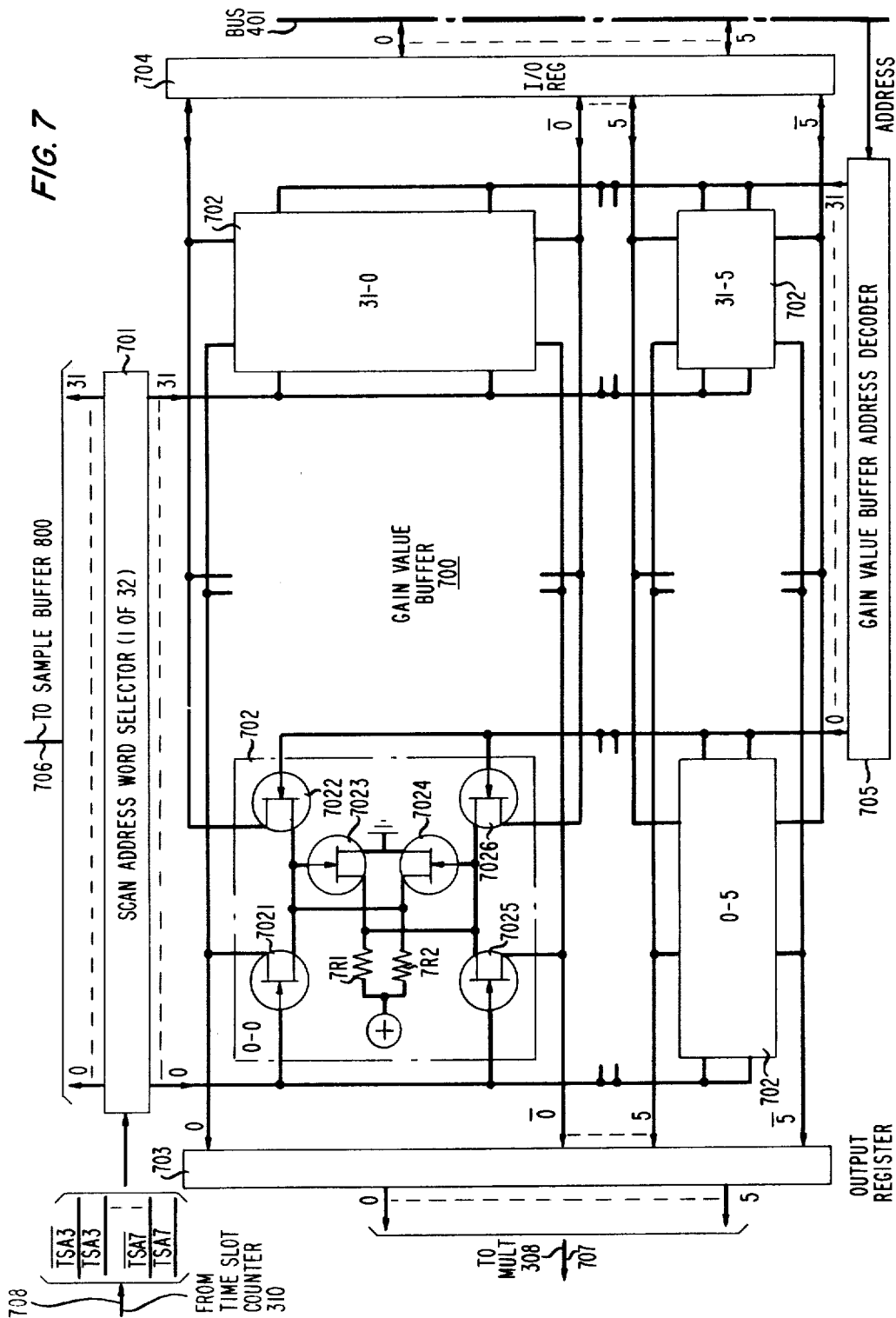

The gain value buffer is shown expanded in FIG. 7 and consists of an NMOS memory array of prior art modified to provide dual access capability. Thus, memory 700 can be accessed either via register 703 or via register 704, each operating with two independent addresses and with two independent data buses. This structure is the subject of a concurrently filed copending patent application of Moffit-Ross, Ser. No. 256,697, which application is hereby incorporated by reference.

Bus 401 can access for read or write purposes any of the 32 locations selected by address decoder 705. Simultaneously, and independently, bus 707 can read out any of the 32 locations selected by address decoder 701. Both buses are extended as bit line pairs through all of the memory locations and access on either bus does not restrict access on the other bus. Bit line pairs are used as set/reset lines for write operations and as differential outputs for read operations. Bit line pair 0 and $\overline{0}$ of register 704 is extended to bit cells 702 of the top row (0-0 to 31-0) and bit line pair 0 and $\overline{0}$ of register 703 is also extended to these same cells. Access from bus 401 is controlled by the microprocessor. This microprocessor writes gain values into the locations to be available with corresponding samples that will be processed by the SB-CAM memory arrangement.

In a non-modified NMOS memory array, one set of bit line pairs and one I/O register with one address decoder would be connected to the memory array. For purposes of this discussion we will assume this to be decoder 701 and register 703. Any read or write operation is a two step process. The first step is to precharge all the bit line pairs. Thus lines ∅ to 5 and $\overline{\emptyset}$ to $\overline{5}$ are driven to a high state by circuits in the register 703. This prevents the lines from changing the data in the bit cells during the next step. For a read, the next step is to turn off the precharge drive and turn on one of the word select lines from the decoder 701. Turning off the precharge drive leaves the bit lines capacitively charged high, while the word select line turns on corresponding transmission gates 7021 and 7025. These transmission gates allow the bit cell to pull down one of the bit lines (∅ or $\overline{\emptyset}$ depending on the stored data). The bit line pair thus conforms to the data stored in the selected bit cell and the register then latches this data for output. The bit cell resistors 7R1 and 7R2 are high value to minimize memory power consumption whereas the transistors 7023 and 7024 are high power to be capable of pulling either bit line low. The precharge is required because the resistors are not capable of pulling the bit lines high.

Figure 12:
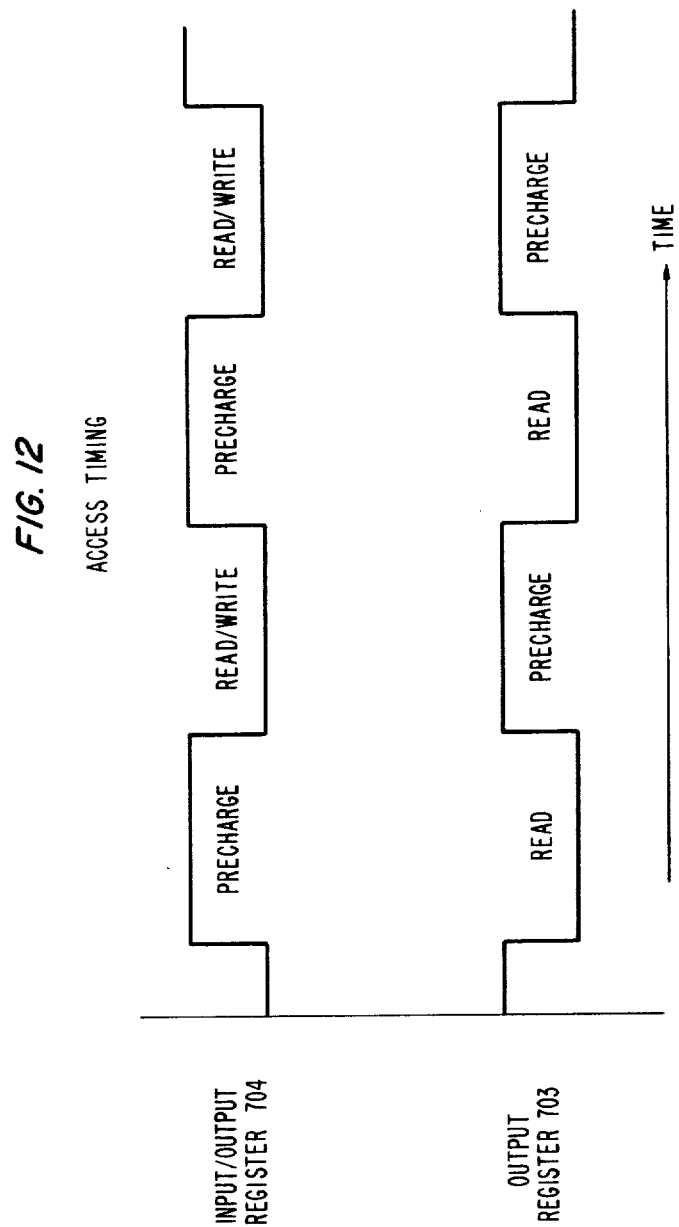
FIG. 12 shows a timing table for controlling a dual access memory.

For a write, the next step is to replace the precharge drive with the drive of the input data, and turn on one of the select lines. The input data overrides the precharge and the bit cell data causing the cell data to be set or reset depending on the input data. Thus the selected cell is written into. The dual bus scheme allows a two phase operating memory system whereby two independent sets of I/O registers and word selectors can access all of the same memory cells on opposite phases of a clock. Thus, as shown in FIG. 12 and as contained in the copending patent application of Moffitt-Ross, Ser. No. 256,697, it can be shown that when one of the registers, such as input/output register 703 is in the precharge mode the actual flip-flop of all memory cells are isolated from that register's bit lines and during that time the other register, such as output register 704, can be in the read/write phase actually accessing any cell. This alternate operation is controlled by oppositely phased clock pulses as shown in FIG. 12. It prevents the potentially disasterous condition of having both bit lines simultaneously selected to the same bit cell. With the GVB, the bus 707 is only used for read operation.

The dual bit line/dual phase operation allows the gain buffer to effectively double its speed so that twice as many accesses can occur through independent ports in the same time interval.

Figure 8:
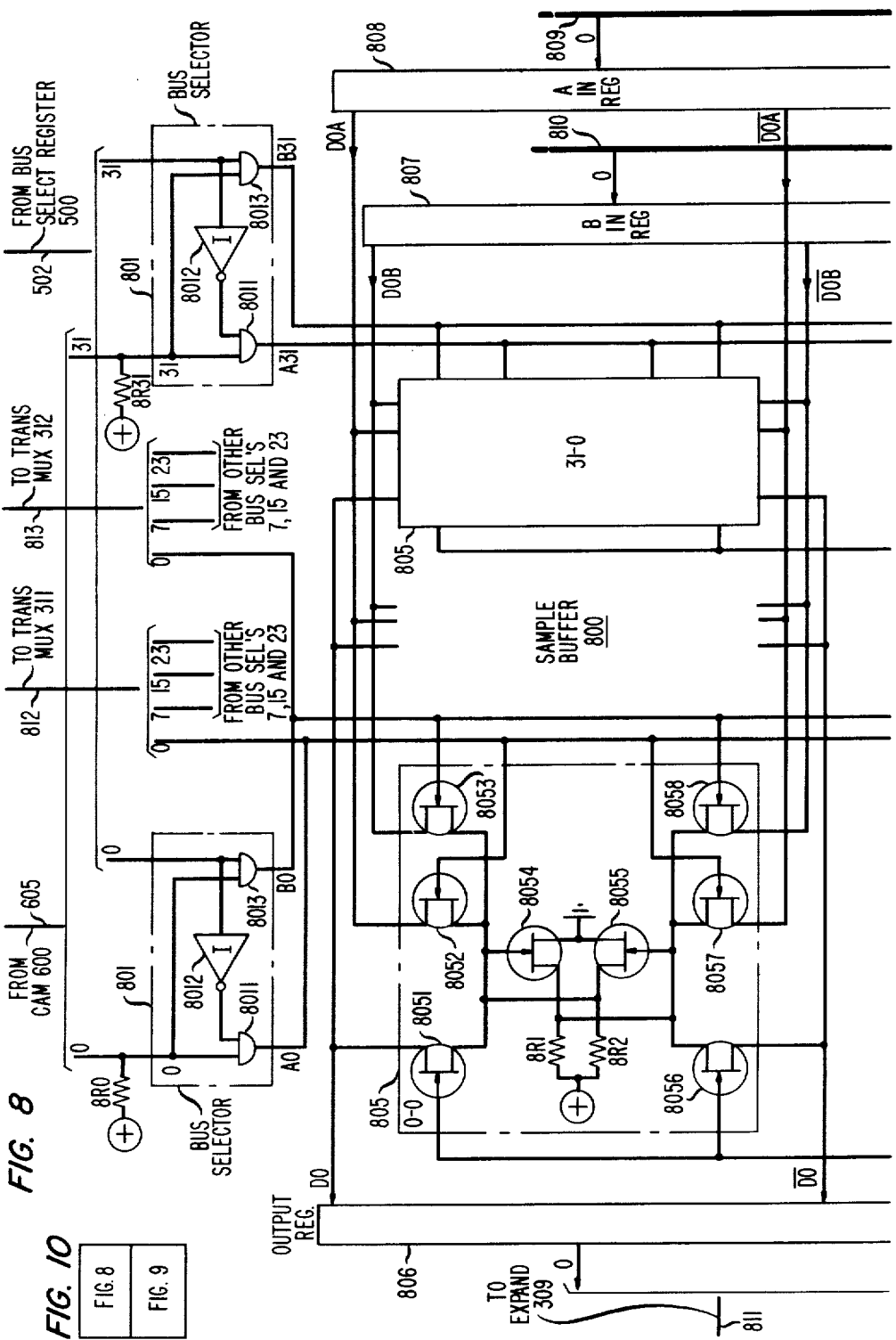
Figure 9:
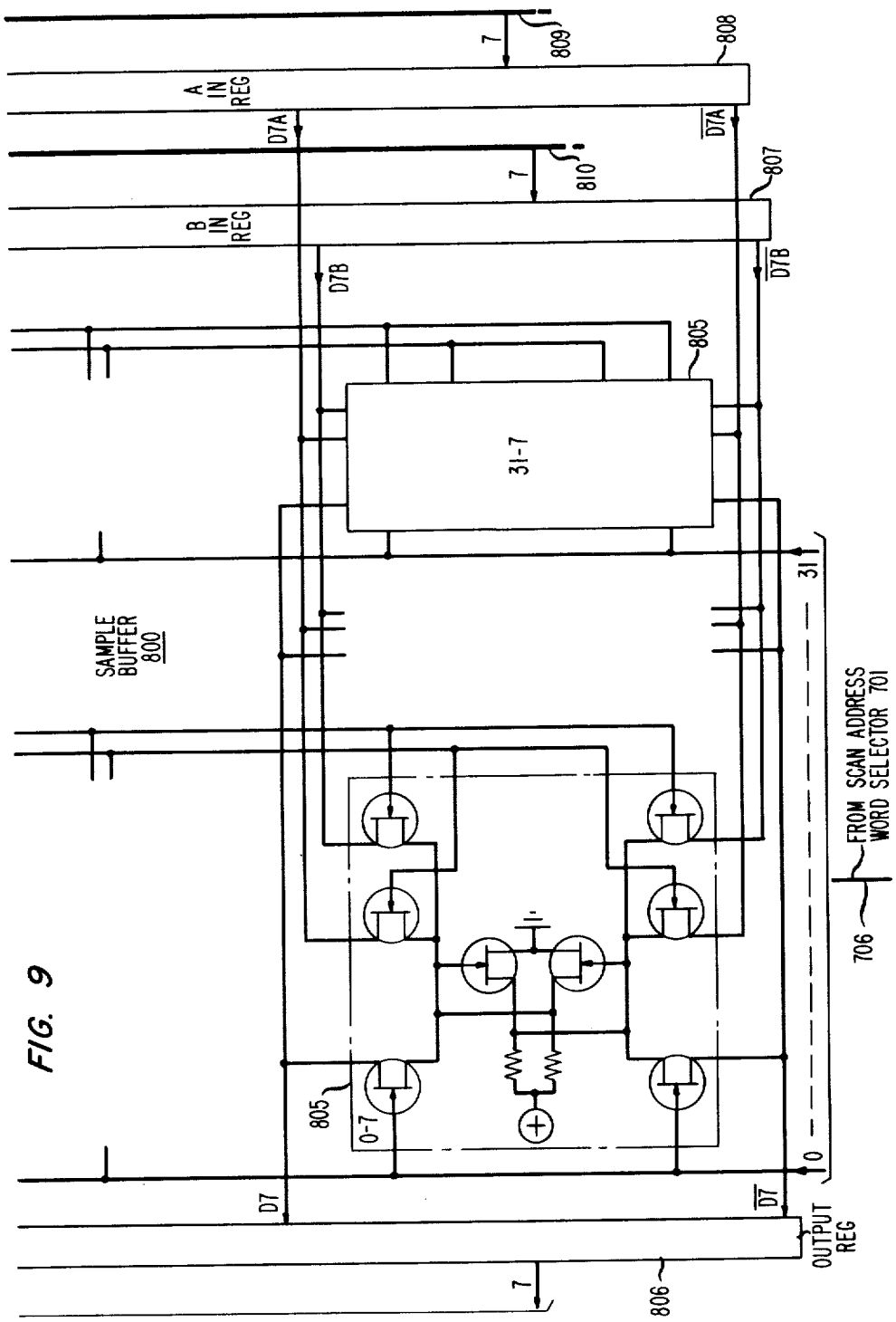

This same dual phase arrangement is utilized with SB 800, as shown expanded in FIGS. 8 and 9. The sample buffer is further expanded by having three bit line pairs and three access ports and bus selection logic for two of the three access ports. Address selection logic for the output port (bus 801) is shared with the GVB. The other two ports (A and B) come from bus 810 and 809 through input registers 807 and 808. Address and port selection for A and B is provided by the CAM and bus selection logic 801. Samples are simultaneously present on buses A and B coming from input registers A and B. The bus selector of each SB location controls from which bus data will be written into its SB location. This arrangement provides a flexible three port memory system in which two ports are inputs and may perform simultaneous writes to more than one location and from either of two buses, while the third port is an output and provides simultaneous reads from a third bus to be scanned out for the conference circuit. Since the two buses A and B are both running on the same phase this could create a conflict for writes except that the bus selection logic insures that for any given location only one bus will provide the write data. The third bus, bus 811, is running on the opposite phase and thus cannot conflict with either bus A or B.

The bus selectors take signals from both the CAM 600 and the BSR 500. The CAM determines when a sample on bus A or B is to be loaded into the corresponding SB location. Its write pulse is directed to write from either bus A or B on the basis of the corresponding BSR bit. As shown in location 0-0 bit cell 805, transmission gates 8053 and 8058 allow data from bus B to be written into the bit cell whereas transmission gates 8052 and 8057 allow data from bus A to be written into the bit cell. Only one of these two sets of transmission gates is enabled at any given time as determined by the corresponding bus selector.

CONCLUSION

While the invention has been illustrated in conjunction with a time slot interchanger conferencing system, such an application is only one embodiment, and it would be obvious to one skilled in the art to use the invention to move data samples from one input to another input, whether or not those inputs are associated with stations, lines, trunks or auxiliary circuits, or from a transmission line to a memory array for later delivery. The memory storage array could be arranged to have a number of storage levels, each level corresponding to one full cycle of the input signal. Thus, it would be possible to store several frames of the input signal in the memory for later delivery. Possibly, such an arrangement could find application in packet switched systems where buffering is required.

It should also be obvious to combine the various memories into a single memory structure, possibly also incorporating the input and output buffers and buses. The clock signal can be internally generated, and separate clock signals may be used for gating purposes.

What is claimed is:

1. A circuit for transferring signals between an input and an output, said input and output having established thereat a plurality of time shared positions, each position having a unique identity, said circuit characterized in that there is included a first memory having address locations therein each location corresponding to a particular one of said output time positions, each location adapted to store thereat the identity of an input time position, means for establishing address inputs for said first memory, said inputs consisting of the identities of said input time positions, and means controlled by a match between an established address input and a stored time position identity at a particular location within said first memory for transferring a signal from the input time shared position corresponding with said matched time position identity to the output time shared position corresponding with said particular first memory storage location.

2. The invention set forth in claim 1 wherein said input and output time shared positions are subdivisions of repetitive frames, said input and output frames being synchronized with each other.

3. The invention set forth in claim 2 wherein the number of input time positions of each frame are different from the number of output time positions of each frame.

4. The invention set forth in claim 1 wherein said transferring means includes a second memory addressable under control of each said first memory match for storing therein, at a location therein associated with said output time shared position, said input signals corresponding with said first memory stored time position identity.

5. The invention set forth in claim 4 wherein said transferring means further includes means for reading said stored input signals from said second memory to said output.

6. The invention set forth in claim 1 wherein said transferring means includes a second memory having one storage location sequentially corresponding with each said output time position, each said location having a correspondence with a particular first memory location, means controlled by each said first memory match for storing in said corresponding second memory location the input signal corresponding with said matched identity, and means for reading said stored second memory input signal from said second memory to said output.

7. In a communication system, a circuit for transferring communication signal samples from a first communication path to a second communication path, said communication paths having created thereon a plurality of repetitive frames, said first communication path frames being subdivided into n time slots and said second communication path frames being subdivided into m time slots, a content addressable memory having m storage locations, each said location associated with a particular one of said second communication path time slots and each said storage location adapted for the storage thereat of the identity of a first communication path time slot, means for establishing address inputs for said content addressable memory, said inputs consisting of the identities of said first communication path time slots, and means controlled by a match at a particular location in said content addressable memory between a stored time slot identity and a said established time slot identity for transferring a signal sample from said first communication path time slot associated with said matched identity to said second communication path time slot associated with said particular memory location.

8. The invention set forth in claim 7 wherein said transferring means includes a second memory having m storage locations, each storage location associated with a particular one of said second communication path time slots.

9. The invention set forth in claim 8 wherein said transferring means further includes means for operating under control of each said content addressable memory match for enabling of storage in said second memory at the storage location therein associated with said particular content addressable memory location.

10. The invention set forth in claim 9 wherein said transferring means further includes means for sequentially reading stored communication signal samples from said second memory for each said frame.

11. The invention set forth in claim 7 where n is greater than m.

12. A time slot interchanger operative for transferring signal samples between first and second buses, said time slot interchanger comprising first and second memory portions each having locations therein corresponding to a particular one of said second bus time slots, means for providing addresses indicative of the time slot identities of said first bus, said means arranged to provide responses to matches between provided ones of said time slot identity addresses and time slot identities priorly written in said first memory portion at an identified location in said first memory portion associated with a specific second bus time slot, and means controlled by each said response signal for writing the signal sample from said first bus time slot corresponding to the matched priorly written time slot identity into said second memory portion at a location therein associated with said identified first memory portion location.

13. The invention set forth in claim 12 further comprising means for removing said samples from said second memory portion.

14. The invention set forth in claim 12 wherein said first memory portion is a content addressable memory.

15. The invention set forth in claim 13 wherein said second memory portion is a dual port random access memory.

16. The invention set forth in claim 12 wherein the second bus time slots are arranged into groups, and wherein there is provided means controlled by the storage of said first bus time slot signal sample in said second memory at locations therein corresponding to second bus time slots within the same group for conferencing said stored signals.

17. The invention set forth in claim 16 wherein said conferencing means includes accumulating means for controlling the accumulation of signal samples from each second bus time slot group.

18. A time slot interchanger operative for transferring signals between time slots of a first bus and time slots of a second bus, said time slot interchanger comprising first and second memories each having storage locations therein, each said storage location corresponding to a particular one of said second bus time slots, the total number of said locations in each memory being equal to the number of second bus time slots, a clock having sequential outputs identical and synchronized with the time slots of said first bus, means for storing first bus time slot identities in said first memory at storage locations corresponding to the desired second bus time slot transfer, said first memory arranged to provide response signals to matches between said clock outputs and time slot identities of said first bus stored in said first memory, each said response signal having a specific locational identity with a particular one of said second bus time slots as determined by the physical location of said stored first bus time slot identity means controlled by each said response signal for storing the first bus time slot signal corresponding to the written identity of said matched time slot in said second memory at said specific location associated with said particular one of said second bus time slots, and means for transferring said stored signals from said second memory to said output bus.

19. The invention set forth in claim 18 wherein the time slots of said input and output buses are divided into frames and wherein the number of input time slots of each frame are greater than the number of output time slots of each frame.

20. A communication system arranged for controlling communication signals between a plurality of stations, said system arranged for digital transmission of signal samples between stations, said stations being grouped into clusters, each cluster served by a local control circuit, a first signal sample bus for interconnecting said clusters and a second signal sample bus for interconnecting the stations served by each said control circuit, each said bus having established thereon repetitive synchronized frames, each frame having a plurality of time slots with the number of time slots of said first bus being greater in number than the number of time slots of said second bus, first and second memories each having storage locations therein, each said storage location corresponding to a particular one of said second bus time slots, the total number of said locations in each memory being equal to the number of second bus time slots, a clock having sequential outputs identical and synchronized with the time slots of said first bus, means for storing first bus time slot identities in said first memory at storage locations corresponding to the desired second bus time slot transfer said first memory arranged to provide response signals to matches between said clock outputs and time slot identities of said first bus stored in said first memory, each said response signal having a specific locational identity with a particular one of said second bus time slots as determined by the physical location of said stored first bus time slot identity means controlled by each said response signal for storing the first bus time slot signal corresponding to the written identity of said matched time slot into said second memory at said specific location associated with said particular one of said second bus time slot, and means for transferring said stored signals from said second memory to said output bus.

21. The invention set forth in claim 20 further comprising means for subdividing each second bus frame into subframes, each subframe having a number of time slots and each subframe associated with a particular one of said stations, and means responsive to the storage of first bus time slot signals in said second memory at storage locations therein corresponding to second bus time slots within the same subframe for conferencing said stored signals.

22. The invention set forth in claim 21 wherein said conferencing means includes means for controlling the accumulation of signals from each subframe, and for providing each said accumulated subframe conference to a particular one of said stations.

23. A circuit for transferring signals from an input line to locations within a storage device, said circuit comprising first means having address locations therein each location corresponding to a particular one of said storage device locations, each said address location adapted to store thereat the identity of a signal appearing on said input line, means for establishing address inputs, said inputs consisting of the identities of said input line signals, and means controlled by a match between an established address input and a stored input line signal identity at a particular location within said first means for transferring the input line signal associated with said matched line signal identity to a location within said storage device corresponding with said particular first means storage location.

24. The invention set forth in claim 23 wherein said input line signals are grouped into frames, and wherein said storage device contains n rows of m storage locations each, said first means having m storage locations, and said transferring means including means for alternating the correspondence of said first means storage locations among said n rows of said storage device so that signals from different input line frames are stored in separate rows of said storage device.

25. The invention set forth in claim 24 further comprising means for sequentially reading each said storage device row.

* * * * *